United States Patent
Washburn

(10) Patent No.: US 8,660,127 B2
(45) Date of Patent: *Feb. 25, 2014

(54) CASCADED LOAD BALANCING

(75) Inventor: James Washburn, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/350,542

(22) Filed: Jan. 13, 2012

(65) Prior Publication Data

US 2012/0113808 A1 May 10, 2012

Related U.S. Application Data

(63) Continuation of application No. 10/860,016, filed on Jun. 4, 2004, now Pat. No. 8,189,590.

(51) Int. Cl.
 *H04L 12/28* (2006.01)
(52) U.S. Cl.
 USPC ........... 370/393; 370/218; 370/229; 370/230; 370/230.1; 370/390; 370/392; 370/401
(58) Field of Classification Search
 None
 See application file for complete search history.

(56) References Cited

U.S. PATENT DOCUMENTS

| 4,451,919 | A |   | 5/1984  | Wada et al. |
| 5,935,268 | A | * | 8/1999  | Weaver .................... 714/758 |
| 5,978,951 | A | * | 11/1999 | Lawler et al. ............... 714/758 |
| 6,707,817 | B1 |  | 3/2004  | Kadambi et al. |
| 6,731,599 | B1 | * | 5/2004 | Hunter et al. ............... 370/229 |
| 2002/0012345 | A1 | * | 1/2002 | Kalkunte et al. ............ 370/389 |
| 2004/0213210 | A1 | * | 10/2004 | Dube et al. ................. 370/352 |
| 2004/0264464 | A1 | * | 12/2004 | Wong .......................... 370/390 |

OTHER PUBLICATIONS

Co-pending U.S. Appl. No. 10/860,016, filed Jun. 4, 2004 entitled "Cascaded Load Balancing" by Washburn, 26 pages.

* cited by examiner

*Primary Examiner* — Jae Y Lee
(74) *Attorney, Agent, or Firm* — Harrity & Harrity, LLP

(57) ABSTRACT

A first network device and a second network device for forwarding data units are included in a network. The second network device is configured to receive data units from the first network device via an output interface from the first network device. Each of the network devices is further configured to form a first value derived from information pertaining to a received data unit, perform a function on the first value to provide a second value, wherein the function of the first network device is different from the function of the second network device when forwarding a same data unit, select an output interface based on the second value, and forward a received data unit via an interface.

20 Claims, 5 Drawing Sheets

CASCADED LOAD BALANCING

RELATED APPLICATION

This application is a continuation of U.S. patent application Ser. No. 10/860,016 filed Jun. 4, 2004, which is incorporated herein by reference.

TECHNICAL FIELD

Systems and methods consistent with the principles of the invention relate generally to computer networks and, more particularly, to load balancing of network devices within computer networks.

BACKGROUND OF THE INVENTION

Load balancing is a way of distributing processing and communications activity across a network such that no one device becomes overloaded. Network devices, such as routers may have one or more sets of load-balanced interfaces, such that when one of the sets of load-balanced interfaces may be used to forward data, one of the interfaces from the set of load-balanced interfaces may be selected. The probability of selecting one of N interfaces in the load-balanced set of interfaces should be 1/N. When a router is configured such that one or more of the N load-balanced interfaces to which it may forward data is connected to another router, the routers are considered to be cascaded. In some networks, cascading of routers may be multiple levels deep.

In some existing networks, the characteristics of the load balancing function is such, that when a router, for example, router A, forwards data to another router, for example, router B, via a load-balanced interface, the conditional probability of router B selecting an interface from among N load-balanced interfaces for forwarding the data may not be 1/N. In other words, in such situations, the load-balancing function of a cascaded router may not distribute the load uniformly.

For example, in one existing network, a router with one or more sets of load balanced interfaces may form a set of bits from data in the packet header, for example, source and destination addresses concatenated together. For the sake of simplicity, we refer to this data as H. In the existing network, each router has unrelated data, per router. We refer to the unrelated data as A. The router then performs a polynomial division by a polynomial p to form a result, R, according to R=(A: :H) mod p, where ": :" is concatenation. R may then be used to derive an index to an interface table to select one of the load-balanced interfaces on which to forward the packet.

Concatenating A to the front of H is equivalent to adding $A \times x^h$ to H, where h is the degree of polynomial H. Thus, mathematically, the router may determine R according to: $R=(A \times x^h + H)$ mod p, which may be used to index an interface table to determine on which of the load-balanced interfaces the packet will be forwarded. Downstream, a second router may determine R2 according to:
R2=$(A2 \times x^h + H)$ mod p, where A2 is the unrelated data of the second router. Suppose A2=A+Z, where "+" is polynomial addition, base 2. Then:

$$R2 = ((A + Z)::H) \bmod p$$
$$= ((A + Z)x^h + H) \bmod p$$
$$= (A \times x^h + Z \times x^h + H) \bmod p$$

If $(z \times x^h)$ mod p happens to be 0, then R2=$(A \times x^h+H)$ mod p=R for all H. In other words, when $(z \times x^h)$ mod p happens to be 0, then the probability that R=R2 is 1 for all H.

Assuming that the upstream router and the downstream router have N load-balanced interfaces, the routers map R and R2 to a number in the range of 1 to N. In the situation where R=R2, both routers will select an interface based on the same number, k, in the range 1 to N. Therefore, R and R2 are not mathematically independent and the cascaded load-balanced interface would not be uniformly selected.

If the upstream router produced a result, A, from R and the downstream router produced a result, B, from R2 and both A and B are in a range of 1 to N, then A and B are mathematically independent if the probability that A equals a value, j, given that B equals, a value i, is 1/N, for all values of i and j in the range of 1 to N. Stated in mathematical terms:

$P[(B==i|(A==j)]=1/n$, for all $i$ and $j$ in the range 1 to N.

The routers described above fail to satisfy this condition.

SUMMARY OF THE INVENTION

In a first aspect, a method is provided for performing load balancing in a network device. A data unit to be forwarded is received by the network device. First data derived from the data unit is used to form a first value. A first mathematical operation is performed a on the first value to provide a second value, wherein the first mathematical operation produces a result for the data unit that is mathematically independent from a result produced by a second mathematical operation for the data unit at an upstream network device. An interface is selected based on the second value and the data unit is forwarded via the selected interface.

In a second aspect, a network device is provided for transferring data units in a network. The network device includes a data unit engine. The network device is configured to receive a data unit, form a first value derived from first information included in the data unit header, obtain a second value, use the obtained second value to perform a first mathematical operation on the first value to provide a third value, wherein the first mathematical operation produces a result for the data unit that is mathematically independent from a result produced by a second mathematical operation for the data unit at an upstream network device, identify an interface based on the third value, and transfer the data unit to a device via the interface.

In a third aspect, a network is provided. The network includes a first network device for forwarding data units and a second network device for forwarding data units. The second network device is configured to receive data units from the first network device via an output interface from the first network device. Each of the network devices is further configured to form a first value derived from information pertaining to a received data unit, perform a function on the first value to provide a second value, the function of the first network device being different from the function of the second network device when forwarding a same data unit, select an output interface based on the second value, and forward a received packet via an interface.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
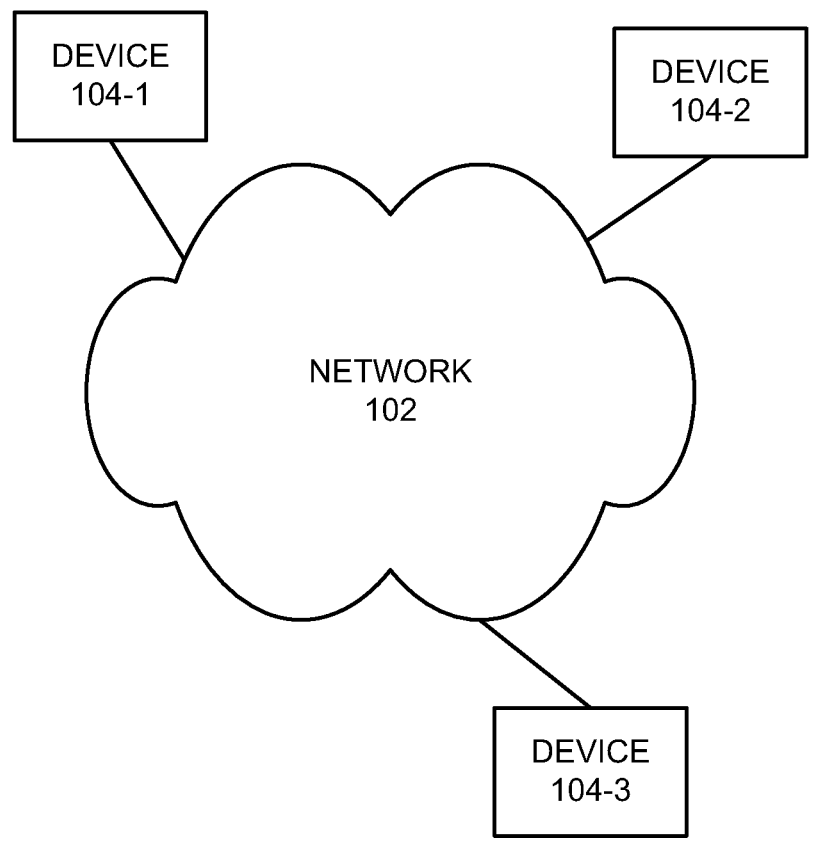
FIG. 1 illustrates a system consistent with principles of the invention.

The following detailed description of the invention refers to the accompanying drawings. The same reference numbers in different drawings may identify the same or similar elements. Also, the following detailed description does not limit the invention. Instead, the scope of the invention is defined by the appended claims FIG. 1 illustrates an exemplary system 100, which includes an implementation consistent with the principles of the invention. System 100 may include a network 102, and devices 104-1, 104-2 and 104-3 (hereinafter collectively referred to as 104) connected to network 102. System 100 may include more or fewer components than shown in FIG. 1. For example, system 100 may have more or fewer devices 104 connected to network 102.

Figure 2:
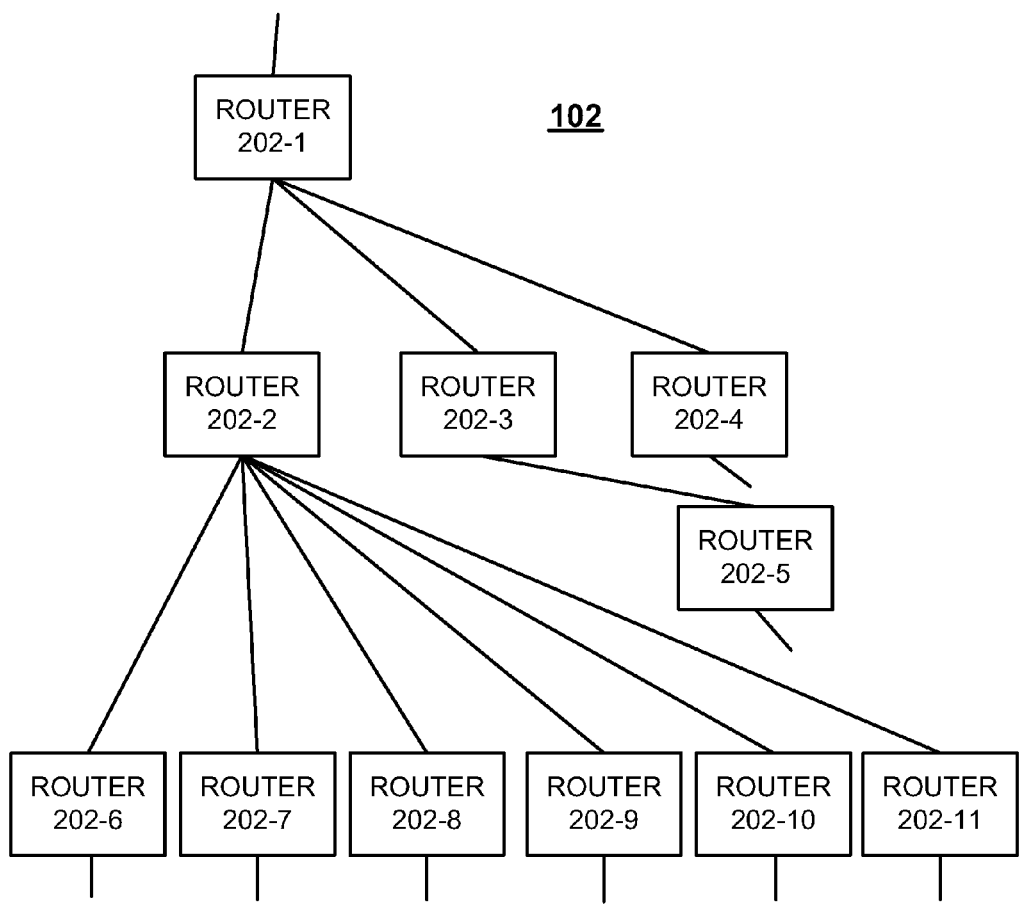
FIG. 2 illustrates a portion of a network shown in FIG. 1.

FIG. 2 illustrates a portion of network 102. Network 102 may include a number of network devices, in this case, a number of routers 202-1 through 202-11 (hereinafter collectively referred to as routers 202). Network 102 may include additional or fewer routers 202 than shown in FIG. 2. Each router 202 may have connections with one or more network devices, such as one or more other routers or network nodes (not shown). As an example of load balancing, packets arriving at router 202-1 may be distributed uniformly among routers 202-2, 202-3 and 202-4 and router 202-2 may distribute packets uniformly among routers 202-6 through 202-11. Some routers 202 may interface with intermediate or edge nodes (not shown). Intermediate nodes may have connections to other nodes via network 102. Edge nodes reside at the edge of a network, such as network 102, and may be connected to devices, such as devices 104.

Figure 3:
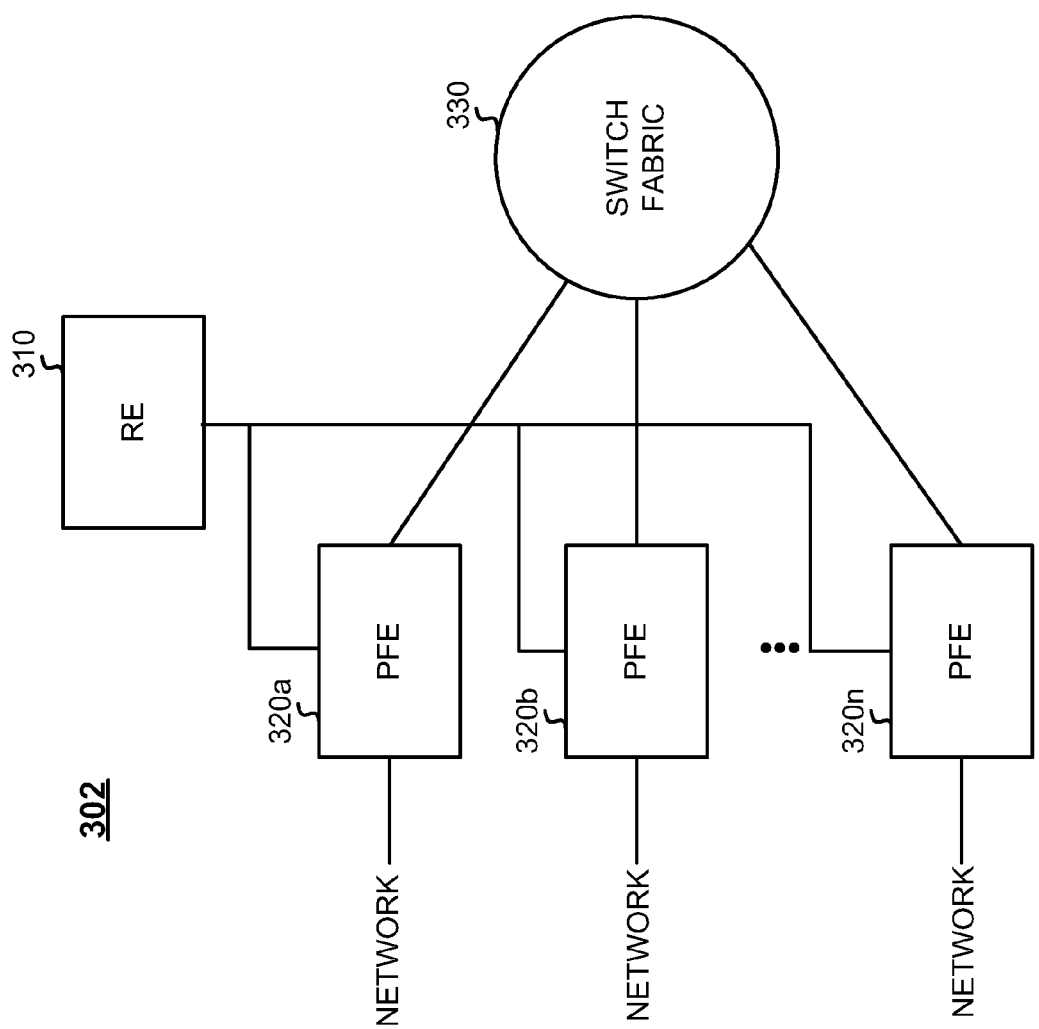
FIG. 3 is a functional block diagram of a network device shown in FIG. 2.

FIG. 3 is a diagram of an exemplary network device consistent with the principles of the invention. In this particular implementation, the network device takes the form of router 302, which may be used to implement one or more routers 202. Router 302 may receive one or more packet streams from a physical link, process the stream(s) to determine destination information, and transmit the stream(s) on one or more links in accordance with the destination information.

Router 302 may include a routing engine (RE) 310 and multiple packet forwarding engines (PFEs) 320a, 320b, . . . 320n (collectively, "PFEs 320") interconnected via a switch fabric 330. Switch fabric 330 may include one or more switching planes to facilitate communication between two or more of PFEs 320. In an implementation consistent with the principles of the invention, each of the switching planes includes a single or multi-stage switch of crossbar elements.

RE 310 may perform high level management functions for router 302. For example, RE 310 may communicate with other networks and systems connected to router 302 to exchange information regarding network topology. RE 310 may create routing tables based on network topology information, may create forwarding tables based on the routing tables, and may send the forwarding tables to PFEs 320. PFEs 320 use the forwarding tables to perform route lookups for incoming packets. RE 310 may also perform other general control and monitoring functions for router 302.

Each of PFEs 320 connects to RE 310 and switch fabric 330. PFEs 320 may receive and send packets on physical links connected to a network, such as network 102. Each of the physical links may include one or more sets of load-balanced interfaces. Each load-balanced interface may be defined by a logical link to a device at a next network hop. Each physical link could be one of many types of transport media, such as optical fiber or Ethernet cable. The packets on the physical link may be formatted according to one of several protocols, such as the synchronous optical network (SONET) standard or Ethernet.

Exemplary Load Balancing

Figure 4:
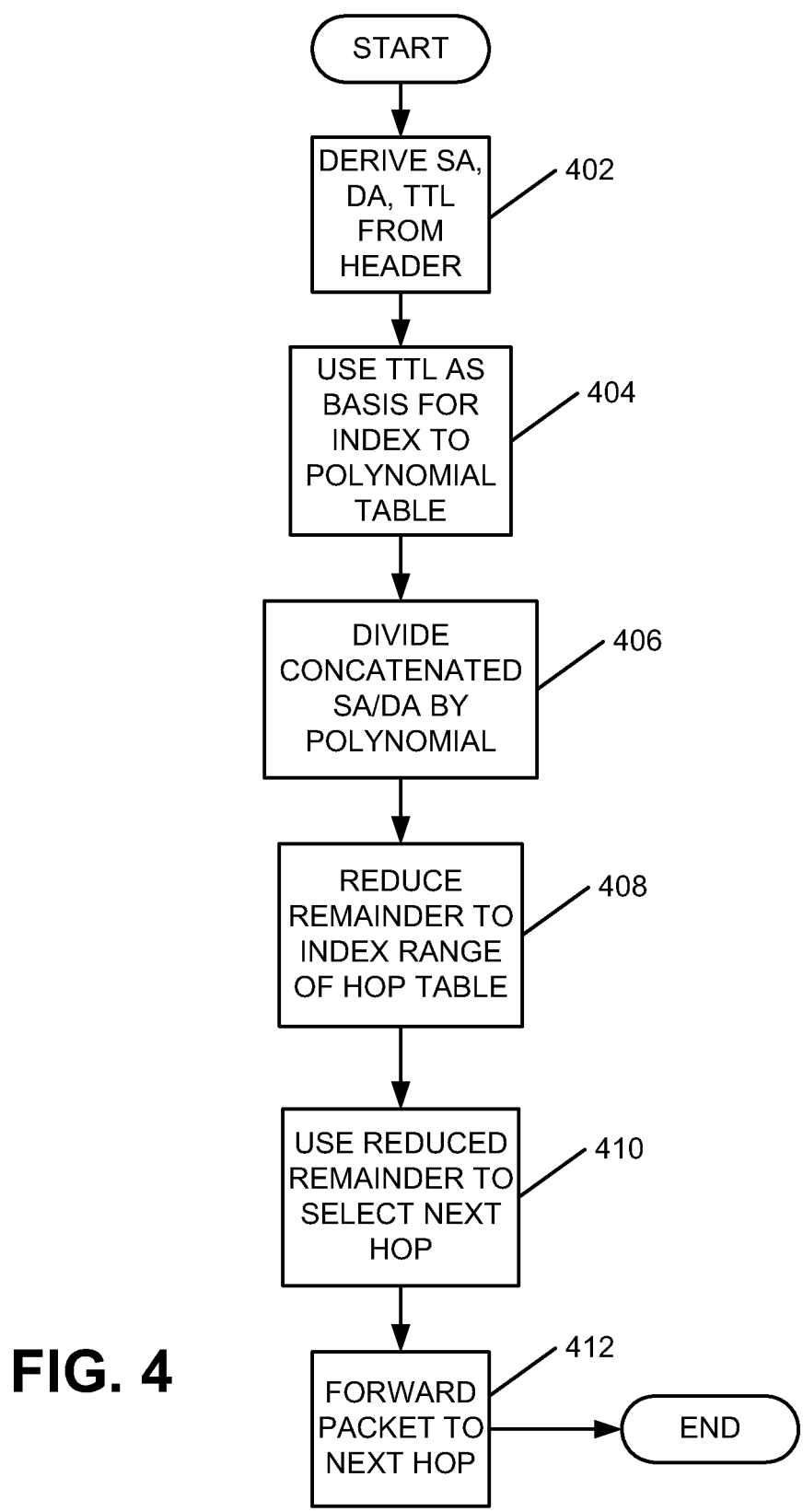
FIG. 4 is a flowchart that illustrates an exemplary process of a network device consistent with the principles of the invention.

FIG. 4 is a flowchart that illustrates an exemplary process that may be implemented in routers 202 consistent with the principles of the invention. In some implementations consistent with the principles of the invention, routers 202 may perform the exemplary process via an Application Specific Integrated Circuit (ASIC) or a Field Programmable Gate Array (FPGA).

Routers 202 may determine that a received packet is to be forwarded on one of a set of load-balanced interfaces. Routers 202 may begin by deriving a source address and a destination address from information in a packet header and extracting a time to live (TTL) from the packet header of a received packet (act 402).

The source address may be an address, such as, for example, a 32-bit Internet Protocol (IP) address of a source of a packet. The destination address may be an address, such as, for example, a 32-bit IP address of a destination of a packet. In some implementations, the source and destination addresses may not be included in the packet header. However, the packet header may include information that can be used to derive the source and destination addresses.

TTL may be a value, such as, for example, an 8-bit value that may be decremented at each hop within network 102. The purpose of the TTL is to prevent packets from circulating through the network indefinitely. Thus, when the TTL is decremented to zero, the corresponding packet is discarded.

Figure 5:
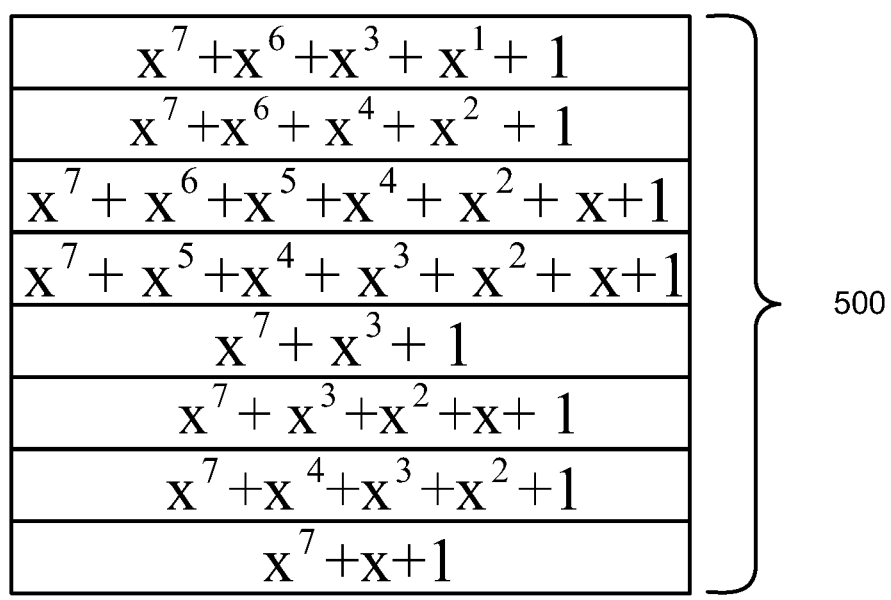
FIG. 5 illustrates an exemplary polynomial table that may be used in a network device consistent with the principles of the invention.

Routers 202 may use TTL, or at least a portion of TTL, as an index into a polynomial table (act 404) and may extract an entry of the polynomial table using the index. Each entry of the polynomial table may include a value that represents a finite field mathematical expression or polynomial. For example, a binary value "0000000001000011" in an entry of the polynomial table may represent the polynomial, $0x^{15}+0x^{14}+0x^{13}+0x^{12}+0x^{11}+0x^{10}+0x^9+0x^8+1x^7+0x^6+0x_5+0x^4+1x^3+0x^2+0x^1+1x^0$, which equals $x^7+x^3+1$. Each polynomial within the polynomial table may be an irreducible or prime polynomial and no two entries are equal. Thus, if this condition is satisfied, then the entries of the polynomial table are relatively prime to all other polynomial entries of the polynomial table. That is, no two polynomial table entries have a factor in common other than 1. FIG. 5 illustrates an exemplary polynomial table 500 that may be used in routers 202. No two entries of polynomial table 500 have a factor in common other than the factor 1. Further, the entries of polynomial table 500 are irreducible or prime polynomials.

Routers 202 may concatenate the source address and destination address from the packet header to provide a large number, such as, for example, a 64-bit number. The large number may be formed by concatenating the destination address to the source address or by concatenating the source address to the destination address. In other implementations, other combinations of numbers may be used to derive a large number. The derived large number may represent a finite field mathematical expression or polynomial in the same manner as an entry of the polynomial table. Routers 202 may then divide the derived large number by the entry of the polynomial table to provide a remainder of the division (act 406). Although the remainder may have one or more negative coefficients, the representation of the remainder only indicates that a non-zero coefficient exists. For example, if the remainder is $x^3+x^2-1$, this may be represented as $1x^3+1x^2+0x^1-1x^0$, which may be represented as a binary value, 0000000000001101. Similarly, the remainder $x^3+x^2+1$, may be represented as $1x^3+1x^2+0x^1+1x^0$, which may be represented as the same binary value, 0000000000001101. Because routers 202 may select one of N load-balanced interfaces to use to forward the packet, routers 202 may reduce the remainder to a range of an index to the polynomial table, for example, 0 to N−1 for an N entry table (act 408). For example, if the remainder is represented by a binary value, 0011111001010101, and the polynomial table has, for example, eight entries, then the binary value representing the remainder may be reduced to be within the range 0-7. This may be achieved by performing a modulo 8 operation on the binary value representing the remainder. In other words, routers 202 may perform a modulo N operation on the remainder, such that the remainder becomes a value in the range of 0 through N−1, inclusive, when the polynomial table has N entries. After deriving the reduced remainder, routers 202 may use the reduced remainder to index a table of hop addresses to obtain an address, such as an IP address, of a next hop within network 102 (act 410). Each of the hop addresses may represent a different interface. Routers 202 may then forward the packet to the next hop within network 102 (act 412).

CONCLUSION

The foregoing description describes embodiments of network devices that select one of a number of load-balanced interfaces for forwarding packets by applying a function to data, which may be derived from a packet header. Because the function applied may be selected based on a number, which changes from hop to hop, cascaded load-balanced network devices may distribute load more uniformly among a group of interfaces than conventional load balanced network devices. Further because the functions that may be applied include different irreducible polynomials, which are relatively prime to one another, there is no relationship between a result produced from an upstream router and a result produced from a downstream router for a given packet. Thus the results are mathematically independent.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, configurations other than those described may be possible. Moreover, systems, methods and apparatus consistent with the principles of the invention may load balance any type of data transfer units, including packets. For example, frames, cells, or virtually any type of data transfer unit could be load balanced using the principles of the invention.

While series of acts have been described with regard to FIG. 4, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method comprising:
   receiving, by a network device, a data unit;
   forming, by the network device, a first value using data derived from the data unit,
       the data including a source address and a destination address;
   obtaining, by the network device and from a memory, information identifying a mathematical expression,
       the information identifying the mathematical expression being obtained using a particular value from the data unit,
           the particular value including a value representing a Time-To-Live for the data unit;
   performing, by the network device and using the mathematical expression, a mathematical operation on the first value to produce a second value;
   selecting, by the network device, an interface, of the network device, based on the second value; and
   forwarding the data unit via the interface.

2. The method of claim 1, where forming the first value includes:
   concatenating the source address and the destination address.

3. The method of claim 1, where the first value represents a first finite field mathematical expression.

4. The method of claim 3, further comprising:
   extracting the particular value from the data unit,
       where the mathematical expression corresponds to a second finite field mathematical expression, and
       where obtaining the information identifying the mathematical expression includes:
           using an index, based on the extracted particular value, to select the information identifying the mathematical expression from the memory,
               where the memory stores information identifying a plurality of finite field mathematical expressions.

5. The method of claim 4, where performing the mathematical operation on the first value to produce the second value includes:
   dividing the first finite field mathematical expression by the second finite field mathematical expression to obtain a numeric representation of a remainder value as the second value.

6. The method of claim 1, where the mathematical operation produces a result that is mathematically independent from a result produced by performing another mathematical operation, for the data unit, at another network device that is upstream or downstream from the network device.

7. A system comprising:
   a network device to:
       receive a data unit;
       use data, derived from the data unit, to form a first value,
           the data including source information and destination information associated with the data unit,
       obtain a second value from a memory,
           the second value being obtained using at least a portion of a particular value from the data unit,
           the particular value including a Time-To-Live value from the data unit,
       perform, using the second value, a mathematical operation on the first value to produce a third value, select an interface, of the network device, based on the third value, and forward the data unit via the interface.

8. The system of claim 7, where the source information includes a source address, and where the destination information includes a destination address.

9. The system of claim 8, where, when using the data derived from the data unit to form the first value, the network device is further to:

concatenate the source address and the destination address.

10. The system of claim 7, where the first value represents a first finite field mathematical expression.

11. The system of claim 10, where the network device is further to:

extract the particular value from the data unit, and where, when obtaining the second value, the network device is to:

use an index, based on at least a portion of the particular value, to select the second value from the memory, the memory including a plurality of values, each of the plurality of values representing a finite field mathematical expression.

12. The system of claim 11, where, when performing the mathematical operation, the network device is further to:

divide the first finite field mathematical expression by the selected second value to obtain a numeric representation of a remainder value as the third value.

13. The system of claim 7, where the mathematical operation produces a result that is mathematically independent from a result produced by performing another mathematical operation, for the data unit, at another network device that is upstream or downstream from the network device.

14. A method comprising:

receiving, by a network device, a data unit to be forwarded by the network device;

forming, by the network device, a first value using data derived from the data unit, the data including source information and destination information associated with the data unit;

obtaining, by the network device, a second value from a memory, the second value being obtained using at least a portion of a particular value from the data unit, the particular value including a Time-To-Live value from the data unit;

performing, by the network device and using the second value, a mathematical operation on the first value to obtain a third value;

selecting, by the network device, an interface based on the third value; and forwarding, by the network device, the data unit via the selected interface.

15. The method of claim 14, where the source information includes a source address, and where the destination information includes a destination address.

16. The method of claim 15, where forming the first value includes:

concatenating the source address and the destination address.

17. The method of claim 15, where performing the mathematical operation on the first value includes:

dividing the first value by the second value to provide a numeric representation of a remainder value as the third value.

18. The method of claim 17, where the mathematical operation produces a result for the data unit that is mathematically independent from a result produced by performing another mathematical operation, for the data unit, at another network device that is upstream from the network device, and where the other mathematical operation is performed by dividing the first value by a fourth value to provide a numeric representation of a remainder value.

19. The method of claim 17, where performing the mathematical operation on the first value further includes:

performing a modulo operation on the remainder value to obtain the third value.

20. The method of claim 14, where the mathematical operation produces a result for the data unit that is mathematically independent from a result produced by performing another mathematical operation, for the data unit, at another network device that is downstream from the network device.

\* \* \* \* \*